Patented July 24, 1951

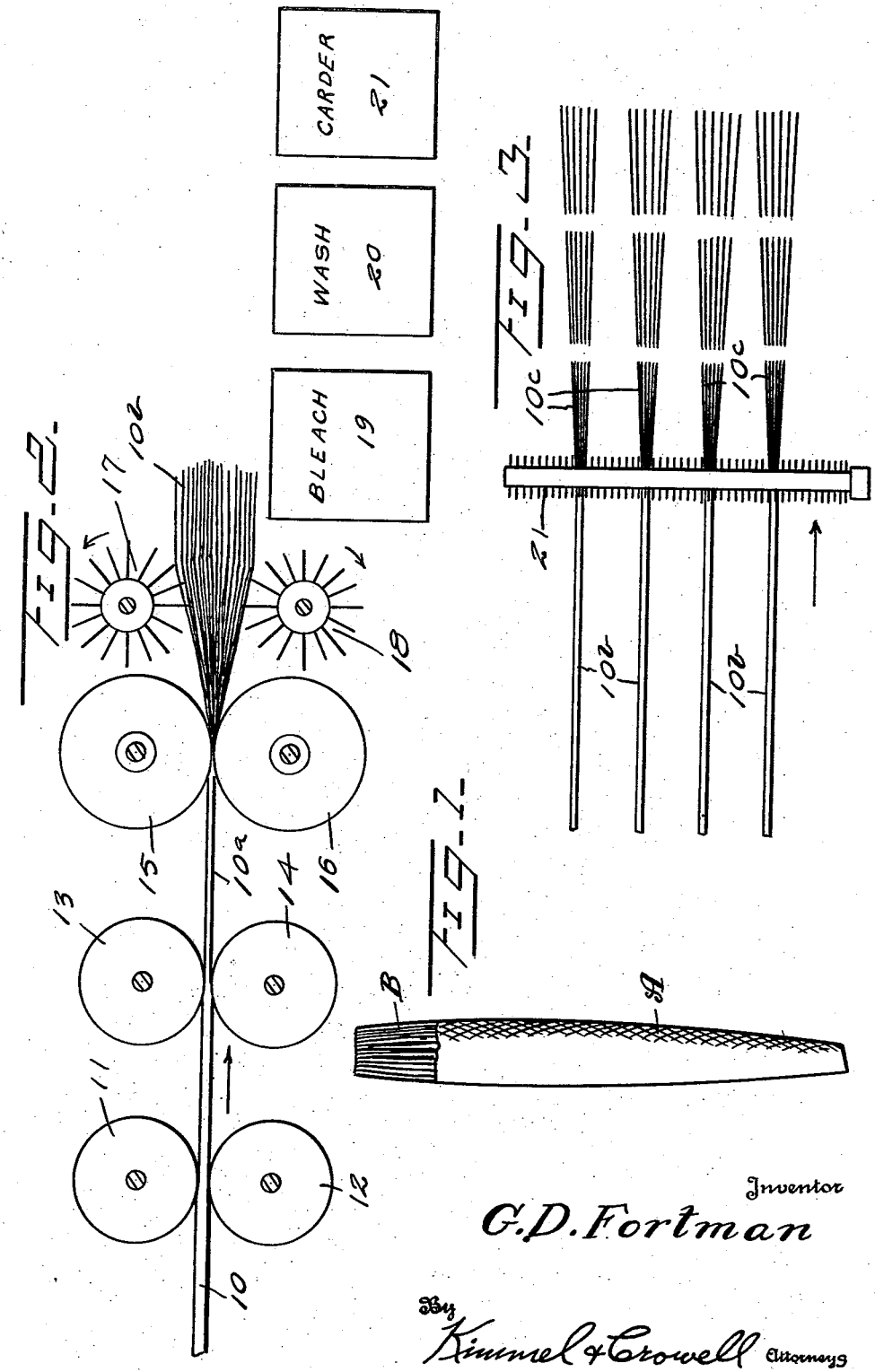

2,561,617

UNITED STATES PATENT OFFICE 2,561,617

PROCESS FOR PRODUCTION OF FIBERS

Gustave D. Fortman, Tampa, Fla., assignor to Flortex Fiber Corporation, Tampa, Fla., a corporation of Florida Application March 19, 1946, Serial No. 655,431

4 Claims. (Cl. 19—8)

The present invention relates to improvements in a process to recover commercially from tropical plants growing wild, and of no intrinsic value otherwise, fibers that admit of textile processing for the production of suitable yarn.

In various sections of any tropical zone certain species of plants grow in a wild condition, having burred stalks and similar forbidding excrescences. Belonging to this species is the so-called Spanish bayonet or Yucca whose plants exhibit a coarse, slender stalk or leaves. Extricating from their leafy bodies fibers suitable for making commercial yarns has been attempted quite frequently since the cost factor involved in securing the raw material is negligible. No commercially feasible process has been evolved and proven successful for long-run production purposes. Doing this is the purpose of my invention.

One of the objects thereof is to provide a simple, efficient and inexpensive process for expressing out and treating the fibers from the Yucca trees or plants in a progressive manner to assure turning out a product, which, after carding, results in good commercial material from which to make yarn, rope, or the like.

Another object thereof is to provide a novel process for treating the Yucca Spanish-bayonet plants in such a manner that the successive steps of treatment follow through for mass production purposes. Not only is the manner of treatment effective, but especially efficacious is the kind of bleaching agent used in the course of treatment of the plant.

A further object thereof is to provide a process for treating the Yucca plants wherein use is made of mechanical and chemical agencies to render the tough texture thereof easily responsible to liberation of the fibers from the exterior gummy casing, separation from the fibers of foreign matter before subjecting the material to chemical treatment, and reducing the cohesiveness of individual strands of the plant to permit easy elongations of the fibers.

With the above and other objects in view, my invention consists in the combination, arrangement, and details of construction disclosed in the drawings and specification, and then more particularly pointed out in the appended claims.

In the drawings, wherein similar reference characters designate similar parts throughout the respective views, Figure 1 shows a leaf from a Yucca plant, broken away to show the ingrained fibers, Figure 2 shows diagrammatically various stages of successive treatment of the plant, in carrying out my process, and Figure 3 shows a bank of plants undergoing final treatment.

Referring to the drawings, which are merely illustrative of my invention, the various details of my invention are disclosed. In Figure 1 is illustrated a leaf from the Yucca tree, which is a species of lily. The exterior of the plant denoted at A is coarse yet flexible and pliable, protecting with a gummy-like substance the inside fibers B which are also coarse. The inside fibers are long and slender, intermingled with considerable cohesiveness.

The first step of the process of liberating the fibers B from the palm leaf A of the Yucca plant consists in passing continuously between a row of upper and lower smooth pressure rolls a series of leaves as shown in Figure 2. The fibers of this plant are strong enough to withstand the mashing pressure exerted thereupon by the rolls which engage their bodies from opposite sides. The leaves A are thoroughly crushed as they pass between the first set of upper and lower rolls 11 and 12 under a light pressure, and then pass between a second pair or set of upper and lower rolls 13 and 14 which apply a pressure upon their textures which is more intense than the pressure imposed upon them by rolls 11 and 12. As the plants 10a are fed continuously forward between the sets of rolls, they gradually emerge between the rolls 15 and 16 which express out and liberate their fibers 10b which begin to spread out freely as shown in Figure 2.

The spreading out liberated fibers 10b of the plant, after leaving the pressure agents are cleaned to remove the gum and pith from the fibers. This is effected by passing the material between a set of upper and lower coarse brushes 17 and 18, the tufts of which readily brush the spreading out fibers from opposed sides so as to dislodge the gummy substance.

The next step of treatment consists in subjecting the mass to immersion in water with a preferred temperature of about 60 degrees F. Next the water is drained off from the material and the material placed in a bleaching solution in the vat 19.

The bleaching compound employed consists of adding to 25 gallons of water, one quart of sodium hypochlorite, and one tablespoon of sodium bicarbonate. The material is allowed to remain in this solution for about four hours.

So far the treatment has tended to de-gum the fibers upon separation from the covering of the Yucca plant. When the material has been taken out of the bleaching vat 19, it is washed in the vat 20 in a solution of water containing a textile softening soap content. After being removed from the washing vat 20 the material is allowed to dry thoroughly. It is now ready for a carding operation to split the larger, long fibers into shorter, thin fibers.

After the long fibers 10b have been washed in clean water in vat 20, the fibers are passed through a carder 21, shown diagrammatically in Figure 3. The carder 21 will lengthwise split the fibers, and in addition, will break the fibers into shorter thin fibers as indicated at 10c. The short thin fibers 10c are of a character which can be spun into yarn strands of desired thickness so that the spun fibers may then be passed to a loom for making fabric.

In order to provide mats or solid masses from the fibers liberated as hereinbefore set forth, the fibers are taken from the bleach and the waste material is taken from the carder from other complete runs of the material. The two materials are intimately united by soaking same into a double strength bleach solution, washed and dried. In this condition they are exposed over a double time interval, this effects their solidification.

The foregoing process has been used with satisfactory results in the manufacture of various yarns. The fibers thus extracted from the wild Yucca plants have been found advantageous for use in making cellulose, linen, paper, rope and twine.

It will be understood that the reference to tropical plants and/or tropical zones also includes other fiber bearing plants in zones other than tropical.

I do not mean to limit myself to the exact details of construction set forth herein save as covered in the appended claims.

What I desire to claim is:

1. In the process for liberating fibers from Yucca plants and the like the steps of mashing the fiber-bearing leaves progressively to express out the fibers from the encasing substances, then brushing the exposed fibers intimately to remove the presence of gummy material, thereafter subjecting the resulting fibers to a moistening agency, next draining the fibers and bleaching same in a solution of water, sodium hypochlorite, and sodium bicarbonate for a period of four hours, then washing the resultant mass in a textile softener soap, and lastly drying the mass prior to carding same.

2. In the process for liberating fibers from Yucca plants and the like the steps of first mashing the leaves of the plants progressively to express out their fibers, brushing the fibers of the plants to clean same from gummy substances, then moistening the fibers prior to immersing same in a bleaching solution containing water, sodium hypochlorite, and sodium bicarbonate for four hours, thereafter draining the bleached fibers and washing same in a textile softening soap solution, and lastly drying the resulting fibers.

3. In the process for liberating fibers from Yucca plants and the like the steps of first mashing the body of the plants progressively under variable pressures to crush the fiber covering substances thereof and express out the fibers, subjecting next the individual fibers to a brushing action to remove foreign particles, thereafter immersing the brushed fibers in warm water, then bringing said washed fibers progressively into contact with a bleaching agency containing twenty-five gallons of water, one quart of sodium hypochlorite, and one tablespoon of sodium bicarbonate for a period of four hours, next washing the resultant mass in a textile softener soap, and lastly, before carding same, drying the ensuing mass.

4. In the process for liberating fibers from Yucca plants and the like the steps of first subjecting the leaves and the fiber-protective outer coatings of the leaves thereof to pressure progressively along its length regulated in intensity to the point of expressing out the fibers, thereafter brushing the fibers to remove gummy and other foreign substances, next immersing the brushed fibers in warm water, then draining off the water from the washed fibers, next placing the fibers in a bleaching agency containing water, sodium hypochlorite, and sodium bicarbonate and allowing it to remain in contact therewith for four hours, thereafter washing the fibers in a textile softening soap solution, and before carding drying the mass thoroughly.

GUSTAVE D. FORTMAN.

REFERENCES CITED

The following references are of record in the file of this patent:

UNITED STATES PATENTS

| Number | Name | Date |
|---|---|---|
| Re. 4,671 | Hopkins et al. | Dec. 12, 1871 |
| 203,386 | Stoner | May 7, 1878 |
| 279,435 | Roberts | June 12, 1883 |
| 1,277,185 | Brown | Aug. 27, 1918 |
| 1,681,540 | Hungerford | Aug. 21, 1928 |
| 1,757,349 | Von Ehrenthal et al. | May 6, 1930 |
| 2,121,210 | Nord | June 21, 1938 |
| 2,220,026 | Rippey | Oct. 29, 1940 |

FOREIGN PATENTS

| Number | Country | Date |
|---|---|---|
| 3,487 | Australia | Aug. 12, 1931 |
| 15,650 | Great Britain | of 1884 |